United States Patent Office 3,113,140
Patented Dec. 3, 1963

3,113,140
PROCESS FOR EFFECTING SUBLIMATION IN A FLUIDIZED BED SUBLIMER
Gunther Matz, Julius Wehn, and Wilhelm Teuffert, Leverkusen, Germany, assignors to Farbenfabriken Bayer Aktiengesellschaft, Leverkusen, Germany, a corporation of Germany
Filed July 18, 1956, Ser. No. 598,562
Claims priority, application Germany July 28, 1955
1 Claim. (Cl. 260—369)

The present invention relates to a process for effecting sublimation in a fluidized bed sublimer.

It has been proposed to sublime substances in a fluidised bed, using a carrier gas, at atmospheric pressure or slight positive pressure. Furthermore, it has been proposed to sublime substances without carrier gas in vacuum sublimers at a vapour pressure which is at the most equal to the vapour pressure of the substance to be sublimed at the sublimer temperature. It is certainly true that the yields from vacuum sublimation effected without carrier gas are relatively high, but the process is intermittent; furthermore, the heat transfer to the solid raw material in the sublimator is poor and danger of overheating exists with decomposable products, owing to varying temperature. The fluidised bed sublimation at atmospheric pressure, on the other hand, does not suffer from these disadvantages, but the output at constant temperature depends on the amount of carrier gas according to the known equation.

$$W_{b1} = V_{a1}\delta_{b1}\frac{pb1}{P-pb1}$$

wherein $W_{b1}$=theoretical amount of sublimate in (kg./h.),
$V_{a1}$=carrier gas velocity in the sublimer in Nm.$^3$/h.,
$pb1$=vapour pressure of the sublimate at the sublimer temperature in mm. Hg,
$\delta_{b1}$=densiy of the sublimate vapour in kg./Nm.$^3$.

If the vapour pressure of the solid raw material at the sublimer temperature is low and if it is impossible to raise the sublimer temperature, the yield can only be increased by increasing the amount of gas, that is to say, by increasing the tower cross-sections. However, an upper limit is set for the size of the tower cross-sections for economic and other reasons.

Figure 1:
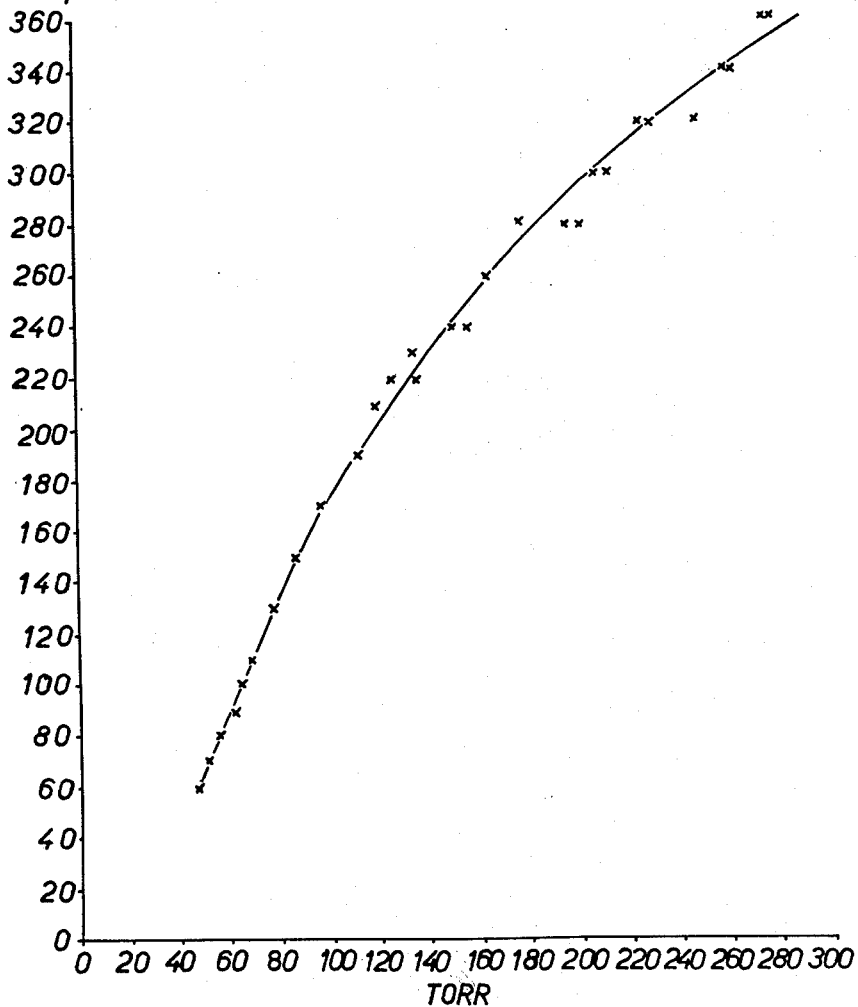

It has now been established that a fluidised bed can also be maintained at reduced pressure. By lowering the total pressure P, there is now produced a reduction in the critical velocity based on atmospheric pressure, i.e. the gas velocity at which the uniform flow just begins. FIGURE 1 shows this dependence of the critical gas velocity on the pressure p behind or above the fluidised bed for a sublimer tube which has an internal diameter of 100 mm. and a fluidised bed consisting of approximately 1800 g. of sea sand with a grain size of 100 to 300μ, the height of the fluidised bed (measured in the static condition) being 21 cm. A fluidisation is no longer possible below a certain vacuum, the so-called "limit vacuum." The "limit vacuum" is determined by the diameter of the sublimer tube, the suction velocity of the vacuum pump, the height of the fluidised bed and the value of the pressure losses of the chambers (filters, condensers and the like) which follow the fluidised bed, their connecting pipes and also the mean grain size of the flow medium.

For example, for a sublimer tube with an internal diameter of 100 mm. and a fluidised bed consisting of sea sand with a grain size of 100 to 150μ, the bed having a height of 21 cm., the limit vacuum (above the fluidised bed) is 29 mm. Hg for a pump with a suction velocity of 2 cu. m. per hour, and 7 mm. Hg for a pump with a suction velocity of 100 cu. m. per hour.

In accordance with the invention it has now been found that the output from the sublimation of material in a vacuum fluidised bed is many times greater than that obtained by sublimation in the fluidised bed at atmospheric pressure if a pressure of the same order as that of the vapour pressure of the substance to be sublimed at the sublimer temperature is maintained at the bottom of the fluidised bed by a vacuum pump, and if the amount of carrier gas drawn in by this vacuum together with the amount of vapour always developed at each point of the bed, is at least so great that the condition of the fluidised bed is maintained. This process has the advantage over the process of sublimation at atmospheric pressure using a carrier gas that a larger output of product is obtained, and as compared with the simple vacuum sublimation (without carrier gas) it has the advantage that the temperature is maintained more satisfactorily and that the heat transfer is better.

Figure 2:
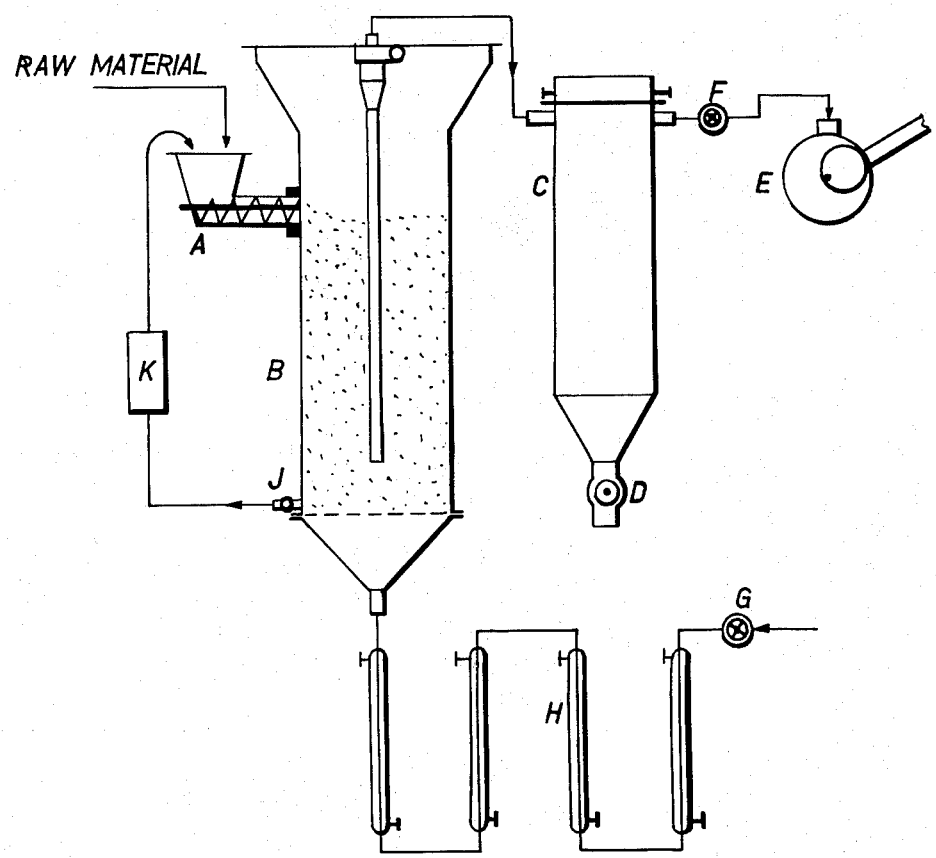

It is advantgeous to use for the process of the invention an apparatus such as that shown diagrammatically in FIGURE 2. The raw material is introduced through a suitable controlled-feed charging device (for example a controlled-feed worm) A, either alone or jointly with the circulating flow medium (depending on the residue content of the raw material), and passes into the fluidised bed sublimer B. The gas serving to produce the whirling motion and as carrier is drawn upwardly by suction through the sublimer and is charged in the latter with sublimate vapour. The vapour is condensed in the condenser C as pure material. The pure product is constantly discharged by means of a suitable discharge device D. The vacuum pump E provides for the discharge of the carrier gas by suction and for the maintenance of the necessary vacuum, which can be set or regulated by means of the regulating valve F. The carrier gas (for example $N_2$) flows from a supply reservoir through a reducing valve G and the preheater H into the sublimer, while the residue enriched flow medium is constantly or intermittently discharged by means of the discharge device J (the method depending on the residue content of the raw material); it is then regenerated and reintroduced together with the raw material.

The invention is further illustrated by the following example without being restricted thereto:

Example

About 450 g. of sea sand with a grain size between 100 and 150μ are introduced into a glass tube with an internal diameter of 100 mm. and a height of 75 cm., the said glass tube being provided at its bottom end with a glass frit and equipped on the outside with an electric jacket-heating system. The bed of this flow medium, which is about 5 cm. high in the rest position, is whirled up with 10 standard litres of $N_2$ per hour which flow through a preheater and the said bed is heated to about 268–270° C. With the sublimer at this temperature, 73 g. of crude anthraquinone and 73 g. of flow medium are constantly introduced hourly into the fluidised bed. By means of a gas ballast pump with a suction capacity of 2 cubic metres per hour, a vacuum of approximately 30–35 mm. Hg is maintained above the glass frit and the fluidised bed. Under the said conditions, this is the "limit vacuum" of the apparatus. 70 g. of ash-free, purified, needle-like anthraquinone is obtained hourly from condensers connected to the sublimer. By means of carrier gas sublimation at atmospheric pressure, at the most 6.55 g./h. could be sublimed at a gas velocity of 10 standard litres per hour and a sublimation temperature of 269° C. An almost 11 fold increase in yield is therefore obtained by the process of the present invention.

We claim:

In the process for vaporizing a divided sublimable material in which the material to be sublimed is fluidized in a fluidized bed with an inert solid flow medium by a carrier gas at a temperature sufficient for the vaporization of the sublimable material, the improvement which comprises maintaining a reduced pressure at the lower portion of said fluidized bed substantially equal to the vapor pressure of said sublimable material at said temperature and allowing an amount of carrier gas to be drawn into said bed in an upward direction, said reduced pressure being sufficient with the vapor developed in the bed to maintain the bed in the fluidized condition.

References Cited in the file of this patent

UNITED STATES PATENTS

| | | |
|---|---|---|
| 1,631,589 | Grosvenor et al. | June 7, 1927 |
| 1,662,070 | Lyford | June 13, 1928 |
| 1,987,282 | Comte | Jan. 8, 1935 |

OTHER REFERENCES

Chemical Engineers Handbook, 3rd Ed., pages 661 and 662 (1950).